United States Patent
Cuppen et al.

(10) Patent No.: US 9,999,111 B2
(45) Date of Patent: Jun. 12, 2018

(54) APPARATUS AND METHOD FOR PROVIDING SETTINGS OF A CONTROL SYSTEM FOR IMPLEMENTING A SPATIAL DISTRIBUTION OF PERCEPTIBLE OUTPUT

(75) Inventors: Roel Peter Geert Cuppen, Eindhoven (NL); Pieter Johannes Hendrikus Seuntiens, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 614 days.

(21) Appl. No.: 13/145,808

(22) PCT Filed: Jan. 20, 2010

(86) PCT No.: PCT/IB2010/050253
§ 371 (c)(1),
(2), (4) Date: Jul. 22, 2011

(87) PCT Pub. No.: WO2010/084462
PCT Pub. Date: Jul. 29, 2010

(65) Prior Publication Data
US 2011/0276152 A1    Nov. 10, 2011

(30) Foreign Application Priority Data
Jan. 26, 2009 (EP) ..................................... 09151305

(51) Int. Cl.
*G05B 15/00* (2006.01)
*H05B 37/02* (2006.01)

(52) U.S. Cl.
CPC ......... *H05B 37/02* (2013.01); *H05B 37/0272* (2013.01)

(58) Field of Classification Search
None
See application file for complete search history.

(56) References Cited

U.S. PATENT DOCUMENTS 5,998,954 A * 12/1999 Scholten ...................... 318/599
6,044,196 A *  3/2000 Winston et al. .............. 385/146
(Continued)

FOREIGN PATENT DOCUMENTS

JP    1996178390 A    7/1996
JP    2000208280 A    7/2000
(Continued)

*Primary Examiner* — Sean Shechtman

(57) ABSTRACT

An apparatus for providing settings of a control system (9) for implementing a spatial distribution of perceptible output in a physical space (1-4; 17), which control system (9) is configured to control at least one output device (6-8,45-48) positioned in that physical space (1-4;17) and to maintain in memory (15) data (56-60) representative of locations associated with the respective output devices (6-8,45-48) in the physical space (1-4; 17) relative to a reference point (26), includes an input device (27,28) for obtaining user input pertaining to at least one location associated with one of the output devices (6-8,45-48). The settings are based on data representative of the user input. The input device (27,28) includes at least one component (27) for manipulation by a user to position at least a first point (31) on the component (27) and a sensor arrangement (28) arranged to provide output for detecting an angular co-ordinate of the first point (31) about at least one axis through a second point (30) of the input device (27,28).

14 Claims, 5 Drawing Sheets

(56) References Cited

U.S. PATENT DOCUMENTS

| | | | |
|---|---|---|---|
| 6,166,389 A * | 12/2000 | Shie et al. ............... 250/504 R |
| 6,611,297 B1 * | 8/2003 | Akashi et al. ................ 348/739 |
| 6,868,337 B2 * | 3/2005 | Muramatsu ................... 701/431 |
| 7,233,831 B2 | 6/2007 | Blackwell |
| 7,308,274 B2 * | 12/2007 | Mohi et al. ................ 455/456.1 |
| 2001/0006384 A1 * | 7/2001 | Usaki ............................ 345/204 |
| 2002/0080173 A1 * | 6/2002 | Tagami et al. ................ 345/753 |
| 2002/0173906 A1 | 11/2002 | Muramatsu |
| 2003/0025673 A1 * | 2/2003 | Ledbetter et al. ............. 345/163 |
| 2005/0074140 A1 * | 4/2005 | Grasso et al. ................ 382/103 |
| 2005/0248529 A1 * | 11/2005 | Endoh ........................... 345/156 |
| 2006/0196347 A1 * | 9/2006 | Iwata .............................. 84/633 |
| 2007/0070351 A1 * | 3/2007 | Nou et al. ..................... 356/446 |
| 2008/0100645 A1 * | 5/2008 | Nitta ............................. 345/690 |
| 2008/0218334 A1 | 9/2008 | Pitchers |
| 2008/0316730 A1 | 12/2008 | Diederiks |
| 2009/0125175 A1 * | 5/2009 | Park et al. ...................... 701/28 |
| 2009/0167483 A1 * | 7/2009 | Jones et al. .................... 340/3.7 |
| 2009/0325595 A1 * | 12/2009 | Farris ........................ 455/456.1 |
| 2010/0235309 A1 * | 9/2010 | Boleko Ribas et al. ........ 706/13 |

FOREIGN PATENT DOCUMENTS

| | | | |
|---|---|---|---|
| JP | 2008537855 A | 9/2008 |
| WO | 2005052751 A2 | 6/2005 |
| WO | 2007072315 A1 | 6/2007 |
| WO | 2007110791 A1 | 10/2007 |
| WO | WO 2007110791 A1 * | 10/2007 |
| WO | 2008001259 A2 | 1/2008 |
| WO | 2008001277 A2 | 1/2008 |
| WO | 2008038179 A2 | 4/2008 |
| WO | 2008139360 A1 | 11/2008 |

* cited by examiner

APPARATUS AND METHOD FOR PROVIDING SETTINGS OF A CONTROL SYSTEM FOR IMPLEMENTING A SPATIAL DISTRIBUTION OF PERCEPTIBLE OUTPUT

FIELD OF THE INVENTION

The invention relates to an apparatus for providing settings of a control system for implementing a spatial distribution of perceptible output. The invention also relates to a method of providing settings of a control system for implementing a spatial distribution of perceptible output. The invention also relates to a computer program.

BACKGROUND OF THE INVENTION

WO 2005/052751 discloses a light system manager for mapping locations of a plurality of light systems. In embodiments, the mapping facility maps lights in a two-dimensional space. A configuration file can store an identifier for each light system, as well as the position of that light system in a desired co-ordinate or mapping system for the environment. The configuration file can also store information about the position that is lit by the light system. In an embodiment, a method of automatically capturing the position of the light systems within an environment is applied. A camera can capture an image for analysis and calculation of the position of a light. In other embodiments, the configuration file can be typed in or it can be put into a graphical user interface that can be used to drag and drop light sources onto a representation of an environment.

A problem of using a camera or a graphical user interface is that it requires a relatively expensive and complicated system, so that it is only really suitable for professional systems for implementing lighting shows.

SUMMARY OF THE INVENTION

It is desirable to provide an apparatus, method and computer program for providing settings of a control system that are simple to implement and intuitive to use.

This object is achieved by providing an apparatus for providing settings of a control system for implementing a spatial distribution of perceptible output in a physical space, which control system is configured to control at least one output device positioned in that physical space and to maintain in memory data representative of locations associated with the respective output devices in the physical space (e.g. relative to a reference point), wherein the apparatus includes an input device for obtaining user input pertaining to at least one location associated with one of the output devices, the settings being based on data representative of the user input, and wherein the input device includes at least one component for manipulation by a user to position at least a first point on the component and a sensor arrangement arranged to provide output for detecting an angular co-ordinate of the first point about at least one axis through a second point of the input device.

Because the control system is configured to control at least one output device positioned in that physical space and to maintain in memory data representative of locations associated with the respective output devices in the physical space relative to a reference point, it can implement a spatial distribution of perceptible output that has been specified independently of any physical environment in an actual physical environment of the user. The user can initially indicate the positions of the output devices using an input device that includes at least one component for manipulation by a user to position at least the first point on the component and a sensor arrangement for detecting an angular co-ordinate of the first point about at least one axis through a second point of the input device. For many types of output, it is sufficient to know the direction from which the output reaches the user or is perceived by the user. In fact, this is a logical way of keeping track of the positions of output devices or the effects provided by them, because scenes (soundscapes, lighting distributions, etc.) are generally built up around a user. The input device with the component for manipulation by the user is sufficient as an interface for providing such information, because it can provide a value of an angular co-ordinate in a co-ordinate system. By contrast, a computer mouse or similar input device requires a graphical display to provide feedback, because it only provides output representing a displacement. Because the user provides the settings, a system for automatic locating output devices is not required. It is noted that the settings may be the initial settings for populating the memory of the control system with data representative of locations associated with the respective output devices or that the settings may be user commands in which the output device or devices to which the command applies is or are specified by means of its location or their locations.

In an embodiment, the component for manipulation by a user defines a surface, the component can be manipulated by a user to indicate a point on the surface as the first point, and the sensor arrangement is arranged to detect the location of the first point.

This embodiment provides a relatively intuitive user interface specifically for specifying a sector or absolute angular co-ordinate in the physical space. It is also relatively easy to implement. This is because an explicit or implicit orientation aid can be provided on the surface to indicate which component position corresponds to an angular co-ordinate value zero.

In an embodiment, data corresponding to an angular co-ordinate of the first point about only one axis through the second point is obtained.

Thus, the data representative of user input includes an angular co-ordinate, which may be an indication of a sector, in a plane generally corresponding to the floor of the physical space. The embodiment is based on the realization that such a specification of position is generally sufficient for many types of output, in particular those that are not attenuated greatly over distances common in rooms of a building.

In an embodiment, the second point is fixed relative to the input device.

This makes the input device easier to use, because the user need not specify the second point.

In an embodiment, the first point on the component corresponds to a point of interaction along a trajectory laid out on the input device and surrounding the second point over at least 180°, in particular a generally closed trajectory.

This embodiment allows for a relatively simple sensor arrangement, which need only be capable of measuring the position of the point of interaction along the trajectory. A generally closed trajectory is suitable for surround lighting and sound, for instance.

In an embodiment, the component for manipulation by a user includes a dial.

The dial may be virtual or physical. A dial is particularly suited to measuring angular co-ordinates.

In an embodiment, the apparatus is arranged to switch between a first mode, in which the user input pertaining to at least one location associated with one of the output devices is obtainable via the input device, and a second mode, in which user input pertaining to at least one controllable aspect of light emitted by output devices associated with the locations to which the user input pertains is obtainable via the input device. This embodiment allows the same input device to be used to specify an aspect of the output of an output device and to specify a location in terms of an angular co-ordinate. Thus, fewer physical components of the input device need be provided, or it can at least be more compact or less cluttered.

In a variant, in the second mode, user input pertaining to a color selection is obtainable via the input device.

The combination with the color specification is particularly suitable, because colors can be specified by means of a location on a color circle, just as angular co-ordinates can be specified as a position on a circle. This embodiment is therefore particular suitable where the output devices include those that emit light of varying colors.

In an embodiment, the input device includes at least one display device for displaying information along a path defined by the component for manipulation by the user, and wherein the apparatus is arranged to adapt the information displayed.

An embodiment of the apparatus includes at least one sensor for contactless measurement of a distance to at least one of the output devices, the settings being further based on data representative of the measured distance.

This embodiment is useful for specifying the location of output devices in more detail where the output is subject to attenuation over the distances characteristic of the physical space. The location is thus specified as at least one angular co-ordinate relative to a reference point in the physical space (relative to an axis through the reference point in case there is only one angular co-ordinate) and a distance to the reference point in the physical space. Of course, the apparatus can translate this specification to another co-ordinate system before providing the settings for the control system.

An embodiment includes an input device for obtaining user input representative of a height level of at least one of the output devices.

This embodiment is suitable for implementing a spatial distribution of perceptible output, specified independently of any physical environment in three dimensions. Generally, the height can be specified as a relative height on a relatively coarse scale, e.g. ground level, eye level, ceiling level. Thus, the input device can be quite simple. Providing a separate input device allows one to retain the simple and intuitive character of the input device used by the user to specify angular co-ordinates.

In an embodiment, at least the input device for obtaining user input pertaining to at least one location associated with one of the output devices is comprised in a portable housing.

An effect is that the input device is easier to use, because it can be taken into the physical space, in fact to the reference point in the physical space. Moreover, it can be turned, so that angular co-ordinate zero of the point of the component for manipulation by the user is aligned with a pre-defined angular co-ordinate of zero—this may correspond to a direction pre-defined as North or twelve o'clock, such as the direction which the user normally faces when seated in a room—when the user operates the input device.

In an embodiment, the apparatus includes an input device for selecting the physical space from among a set of physical spaces.

An effect is that the same input device can be used for providing settings pertaining to positions associated with output devices in more than one space, e.g. room. This information can also be used by the control system to infer physical characteristics of the physical space when controlling the output devices. For instance, a bathroom is generally tiled, so that light is reflected off the walls, and sound often reverberates.

According to another aspect of the invention, there is provided a method of providing settings of a control system for implementing a spatial distribution of perceptible output, which control system is configured to control at least one output device positioned in that physical space and to maintain in memory data representative of locations associated with the respective output devices in the physical space (relative to a reference point), wherein the settings are based on data representative of user input pertaining to at least one location associated with one of the output devices, and wherein at least part of the data representative of user input is obtained from of an input device including at least one component for manipulation by a user to position at least a first point on the component and a sensor arrangement providing output for determining an angular co-ordinate of the first point about at least one axis through a second point of the input device.

The method is very suited to providing settings in a format suitable for implementing a spatial distribution of sound, light or the like, because such distributions are generally specified in a user-centric way to create a particular immersive experience for the user.

An embodiment of the method includes the use of an apparatus according to the invention.

According to another aspect of the invention, there is provided a computer program including a set of instructions capable, when incorporated in a machine-readable medium, of causing a system having information processing capabilities to perform a method according to the invention.

The computer program enables the settings to be processed from input obtained from an input device in an apparatus according to the invention.

BRIEF DESCRIPTION OF THE DRAWINGS

The invention will be explained in further detail with reference to the accompanying drawings, in which.

DETAILED DESCRIPTION

Consumers like to realize a personalized environment in which they can create their own ambiences. A system is described herein that allows them to create their own ambiences in any of a number of rooms 1-4 in their house 5. The system is also suitable for professional use. In the example to be described herein, the ambience is the result primarily of lighting effects. This can be augmented by particular soundscapes or tactile effects.

Figure 1:
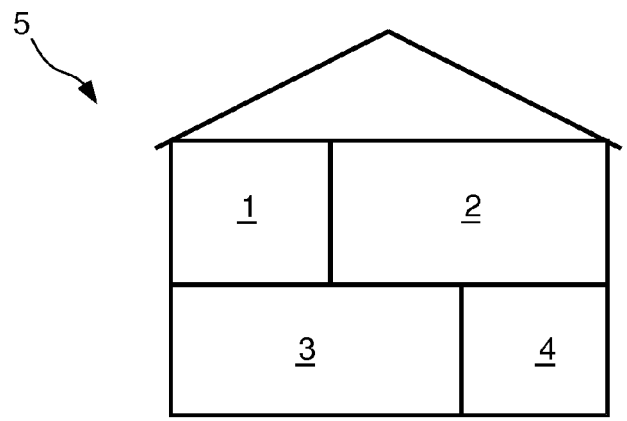
FIG. 1 is a schematic cross-sectional diagram of a building in which there are several spaces in which an immersive experience can be created.
Figure 2:
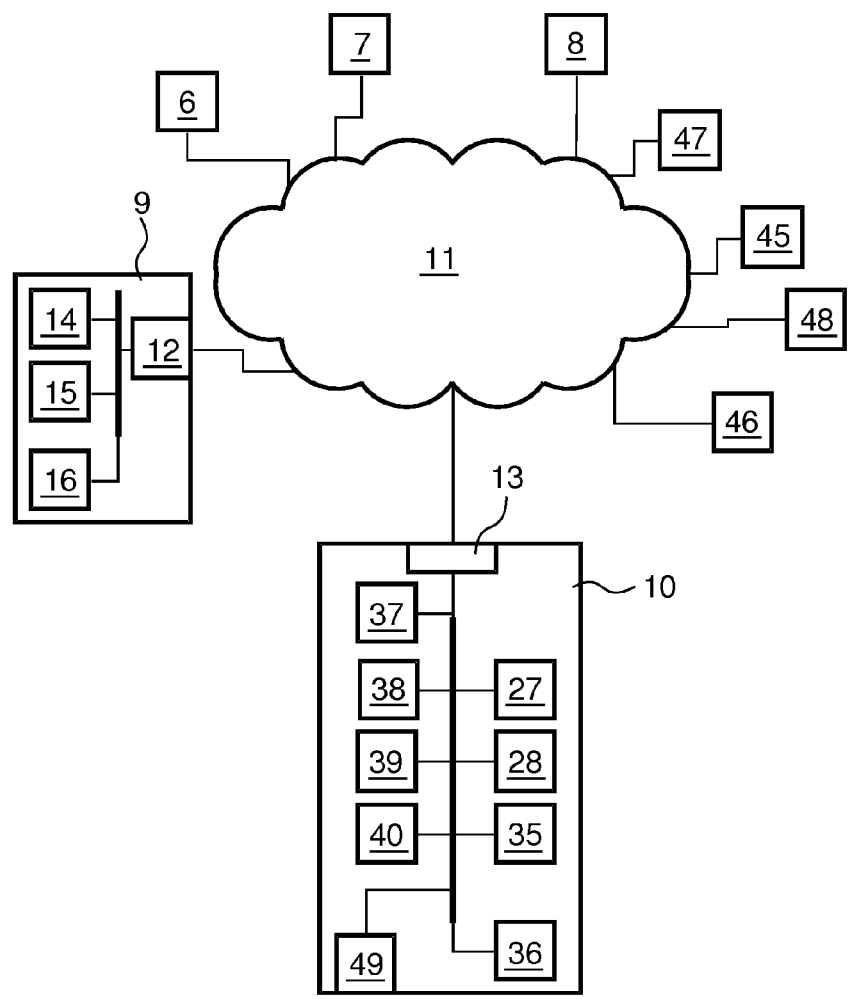
FIG. 2 is a schematic diagram showing some components of a system for creating an immersive experience.

Referring to FIG. 2, any number and combination of light units 6-8 can be comprised in the system, although there are at least two, and the number is essentially unlimited. Such light units 6-8 are complex and flexible, with more than one adaptive parameter, for example, hue, saturation and brightness.

Using a light switch on the wall for each light unit 6-8 will not work very well where such complex light units 6-8 are used in such large numbers. For this reason, a control device 9 and an associated portable unit in the form of a remote control unit 10 for the control device 9 are provided. The light units 6-8 are connected to the control device 9 via a network 11, e.g. a wireless local area network according to one of the IEEE 802.11 standards or a wireless personal area network according to the ZigBee or Bluetooth specification. In the illustrated embodiment, the remote control unit 10 and the control device 9 communicate with each other via a respective interface 12,13 to the network 11, but there may be a direct link in an alternative embodiment. Also, the control device 9 can be integrated into one of the light units 6-8.

The control device 9 uses an abstract description of a light distribution associated with a particular type of ambience as an input. It translates such an abstract description into control signals for the light units 6-8 to re-create the ambience in the particular physical space in which the light units 6-8 are located. To this end, the control device 9 is provided with a data processing unit 14 and memory 15, as well as at least one I/O device 16 for obtaining specifications of spatial distributions of light that are independent of any physical environment, in particular the physical space in which the light units 6-8 are located.

The specification can, for example, be in terms of the locations of particular effects, using a description language such as the amBX description language. The control device 9 is configured to parse the language, determine how the described effects can be generated by the available light units 6-8 and provide the appropriate update signals to the light units 6-8 via the network 11.

Figure 3:
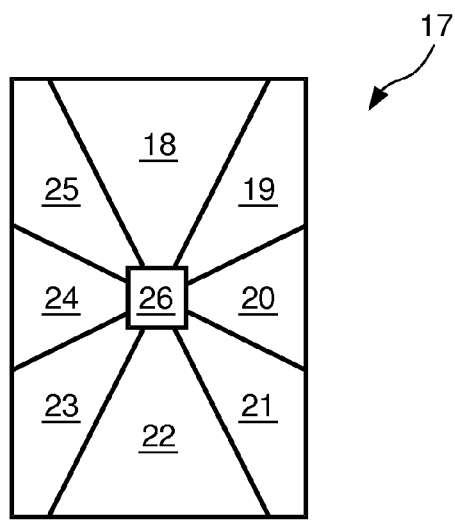
FIG. 3 is a schematic diagram showing a map of one such physical space.

Many of the specified effects are not only dependent on the type of light unit 6-8, but also on the location of the light units 6-8. A suitable specification of locations is illustrated in FIG. 3, showing in two dimensions how the floor space in a room 17 has been divided into sectors 18-25 corresponding to compass points. There is no concept of relative scale, so that no distinction is made between small and large rooms. Instead, the sectors 18-25 are concentrated on a reference point 26, assumed to correspond to the position of a user. A first sector 18, corresponding to North or twelve o'clock, corresponds to the direction of natural attention. In a physical room, this would be e.g. the direction in which a user seated on a sofa or in the main chair faces.

To implement in the physical space that includes the available light units 6-8 a spatial distribution of perceptible output specified abstractly, the control system maintains in memory 15 data representative of locations associated with the respective light units 6-8 in the room 17 relative to the reference point 26 and, optionally, further location details, e.g. height or distance to the reference point 26.

Figure 4:
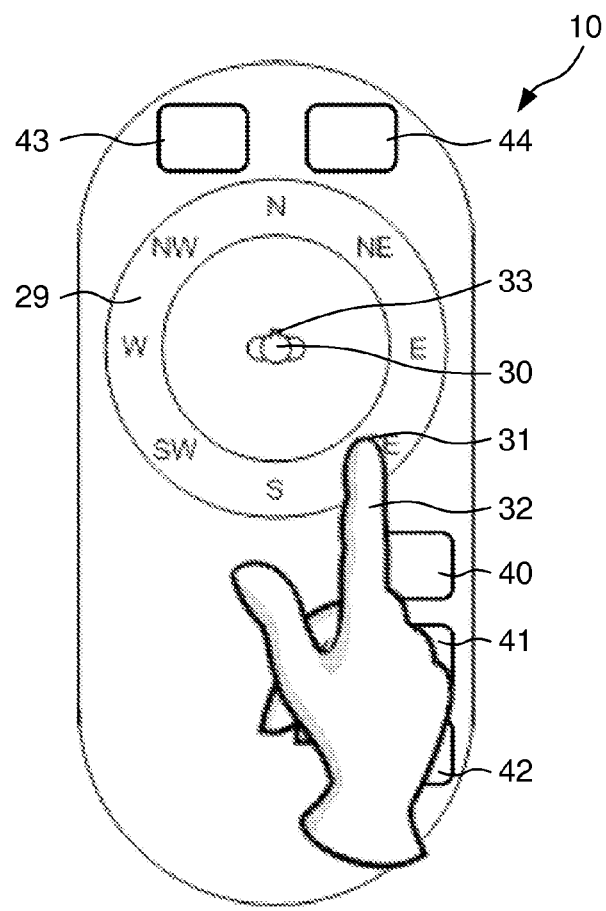
FIG. 4 is a schematic view of a first embodiment of remote control unit comprising an input device for providing user input pertaining to at least one location of an output device of the system of FIG. 2.

The data are provided as settings, which are based on data representative on user input pertaining to at least one location associated with a light unit 6-8. The location is the location of the light unit 6-8 concerned, the location of the lighting effect it produces (i.e. where it is visible), or both. The user input is obtained by means of an input device included in the remote control unit 10. It is in the form of a touch screen device that can be manipulated by a user and includes a display device 27. The display device 27 displays angular co-ordinates when locations are being input by the users (FIG. 4). The touch screen device further includes a sensor arrangement 28 (FIG. 2) for detecting an angular co-ordinate of a point on the touch screen relative to at least one axis through a reference point. Manipulation of a component in this context therefore means that the user can touch this component and change the position of the point of contact, either relative to the component or by moving the component.

In the embodiment of FIG. 4, the remote control unit 10 includes a touch screen device that is round, an outer area being in the shape of a wheel 29, along which angular co-ordinates are displayed by the display device 27. The wheel 29 is implemented as a part of a surface in the form of a closed loop laid out in a plane on the remote control unit 10, which closed loop surrounds a central point 30. The position of a point 31 of interaction between a user's finger 32 and the wheel 29 can be detected and corresponds to an angular co-ordinate about an axis through the central point 30 and perpendicular to the plane of the wheel 29.

In the embodiment of FIG. 4, angular co-ordinates are shown as compass points, which correspond to the sectors displayed in FIG. 3. The touch screen device occupies the entire area within the outer edge of the wheel 29, and an orientation aid 33 is displayed in a central part to help the user relate angular co-ordinates relative to an axis through the central point 30 to angular co-ordinates relative to a horizontal axis through the reference point 26 in the room 17.

Figure 5:
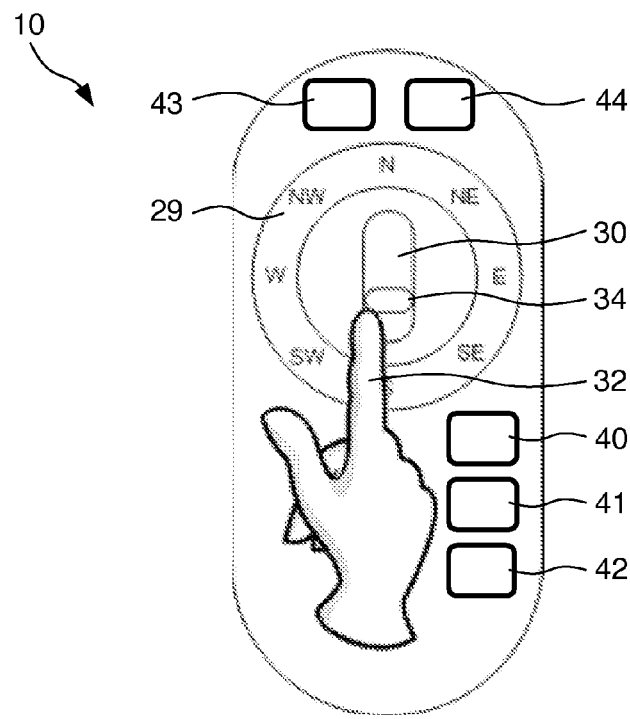
FIG. 5 is a schematic view of the remote control unit in a different mode, for providing further user input pertaining to at least one location of an output device of the system of FIG. 2.

Referring to FIG. 5, the remote control unit 10 can be re-configured to provide a further input device in the shape of a virtual slider 34. It also comprises a number of further input devices 35-39 comprising physical buttons 40-44.

The slider 34 is an optional feature that allows a user to specify a height level in addition to an angular co-ordinate. In an embodiment, the height can be selected from a set of values, for example five values or fewer, in particular three. The values can be relative values, e.g. floor, eye level and ceiling level.

In the illustrated embodiment, three buttons 40-42 are comprised in corresponding input devices 35-37 for setting positions of three different types of output devices, e.g. the light units 6-8, loudspeakers 45,46 and tactile output devices 47,48.

A fourth button 43 can be included in an input device 38 for engaging a device 49 for measuring a distance from the reference point 26 in the room 17 to one of the light units 6-8, one of the loudspeakers 45,46 or one of the tactile output devices 47,48. This measurement device 49 can, for example, respond to an infra-red light (not shown) fitted to the output device concerned. Alternatively, it can measure the signal amplitude when the output device is controlled to provide an output of pre-determined strength. Other contactless distance measurement methods can be used.

A further button 44 is included in an input device 39 for indicating a switch of input mode. In the context of providing settings for the light units 6-8, in a first mode, the user input pertaining to at least one angular co-ordinate is provided using the wheel 29 (FIG. 4). In a second mode, the slider 34 is presented (FIG. 5). In a third mode, the wheel 29 changes appearance through appropriate control of the display device 27, such that the compass points of FIGS. 4 and 5 disappear, to be replaced by a depiction of a color circle. The point of contact 31 with the wheel 29 then corresponds to a position on the color circle, so that the user can set a color of output, for example. Further details of how this functionality is implemented are given in WO 2008/038179.

Figure 6:
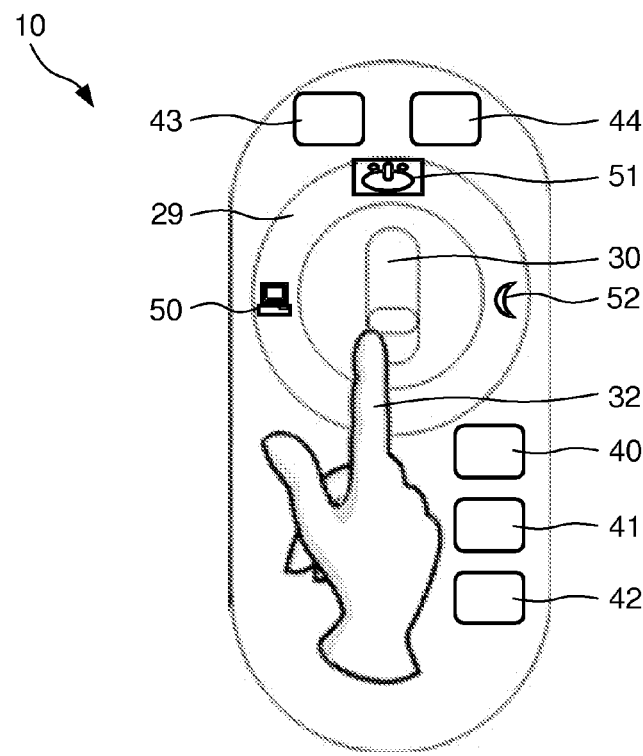
FIG. 6 is a schematic view of the remote control unit in yet another mode, with a display associated with the input device adapted.

In a fourth mode, the wheel 29 changes appearance again, to the form illustrated in FIG. 6. In this mode, icons 50-52 representing the rooms 1-4 in the house 5 are displayed. This mode can be used to allow the user to store a set of locations of output devices for each of the rooms 1-4. The same remote control unit 10 and control device 9 can thus be used in the whole house 5.

Figure 7:
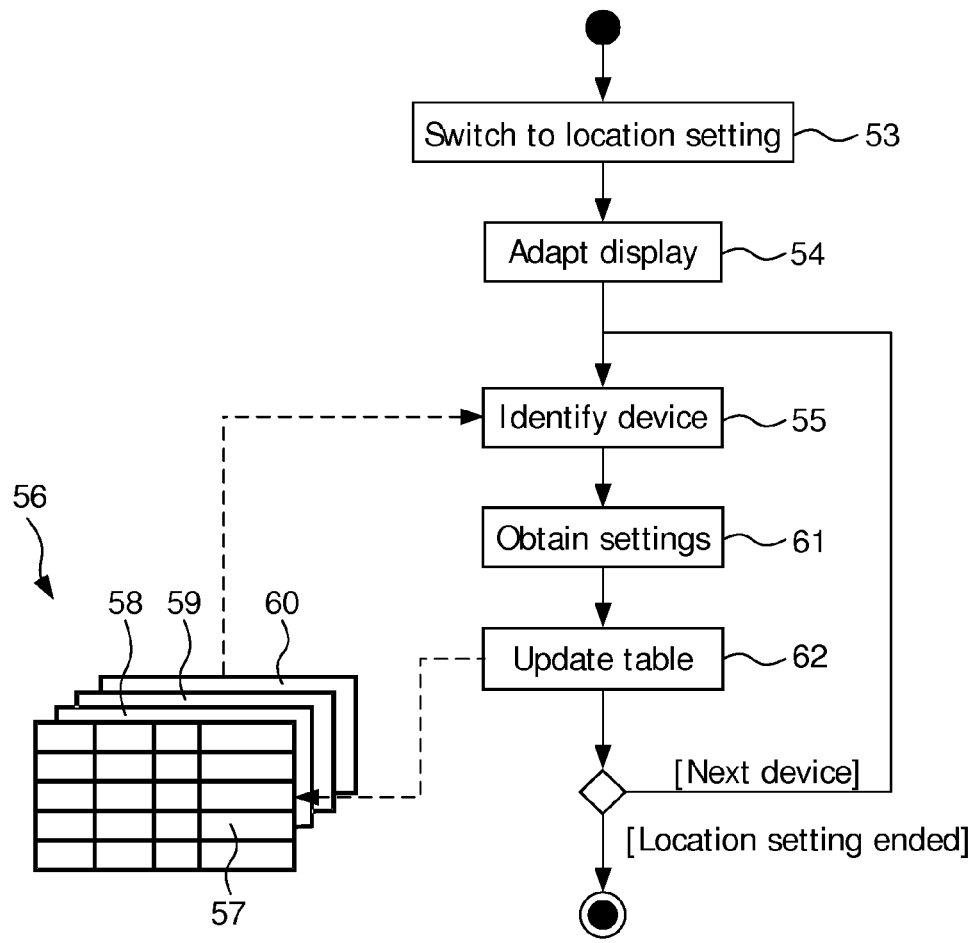
FIG. 7 is a flow chart illustrating a method of populating a table associating output devices with locations in a physical space.

FIG. 7 illustrates how the locations of the various output devices 6-8,45-48 can be set in memory 15.

Pressing one of the buttons 40-42 will switch (step 53) the apparatus comprising the control device 9 and the remote control unit 10 to the location setting mode. It is suggested that that the remote control unit 10 will take on the appearance of FIG. 4 by default. Alternatively, the wheel 29 will appear as in FIG. 6, and the user first selects a room and then presses the button 44 to switch to the mode for setting the locations of e.g. the light units 6-8 within the room 17, for which purpose the remote control unit 10 adapts the output of the display device 27 (step 54).

So that the user knows which of the light units 6-8 he or she is setting the position of, the device is identified (step 55). The control device 9 can for instance trigger only that particular light unit 6-8 to provide a pre-determined output. Alternatively, a separate light can be provided on each light unit 6-8, which is switched on when that light unit 6-8 is in focus. In yet another embodiment, the user indicates the device. For example, each light unit 6-8 can be made to provide a unique output signal, and the distance measuring device 49, for example, can be pointed at the light unit 6-8 to capture that signal. Other embodiments are possible.

The control device 9 maintains a database 56 e.g. in the form of multiple tables 57-60 one for each room 1-4 in the house 5.

With the light unit 6-8 identified, the user moves his or her finger 32 to the relevant point of contact 31 to indicate the sector 18-25 of the room 17 in which the light unit 6-8 identified previously is located. In an embodiment, this co-ordinate corresponds to the position along the wheel 29 of the point of contact 31 at the time of release. In another embodiment, some other form of confirmation that the input is correct is given, e.g. a tapping gesture, or maintenance of the same point of contact 31 for the duration of a pre-determined interval of time confirms the user input.

If required, the user may next move the slider 34 to indicate the height level of the light unit 6-8 to which the input pertains and/or direct the remote control unit 10 at it and press the button 43 for obtaining a distance measurement.

With these data obtained, data representative of the user input are used to obtain settings (step 61) for entry (step 62) into an entry of the table 57 of the database 56 that is associated with the identified light unit 6-8. The step 61 of obtaining settings can be carried out in either or both of the control device 9 and the remote control unit 10. In an embodiment, it involves a translation of the user input data into settings in a particular format appropriate to the database 56.

Then, the control device 9 or the user identifies the next light unit 6-8 for which settings are to be provided, unless the table 57 in the database 56 is complete, in which case the method ends.

Figure 8:
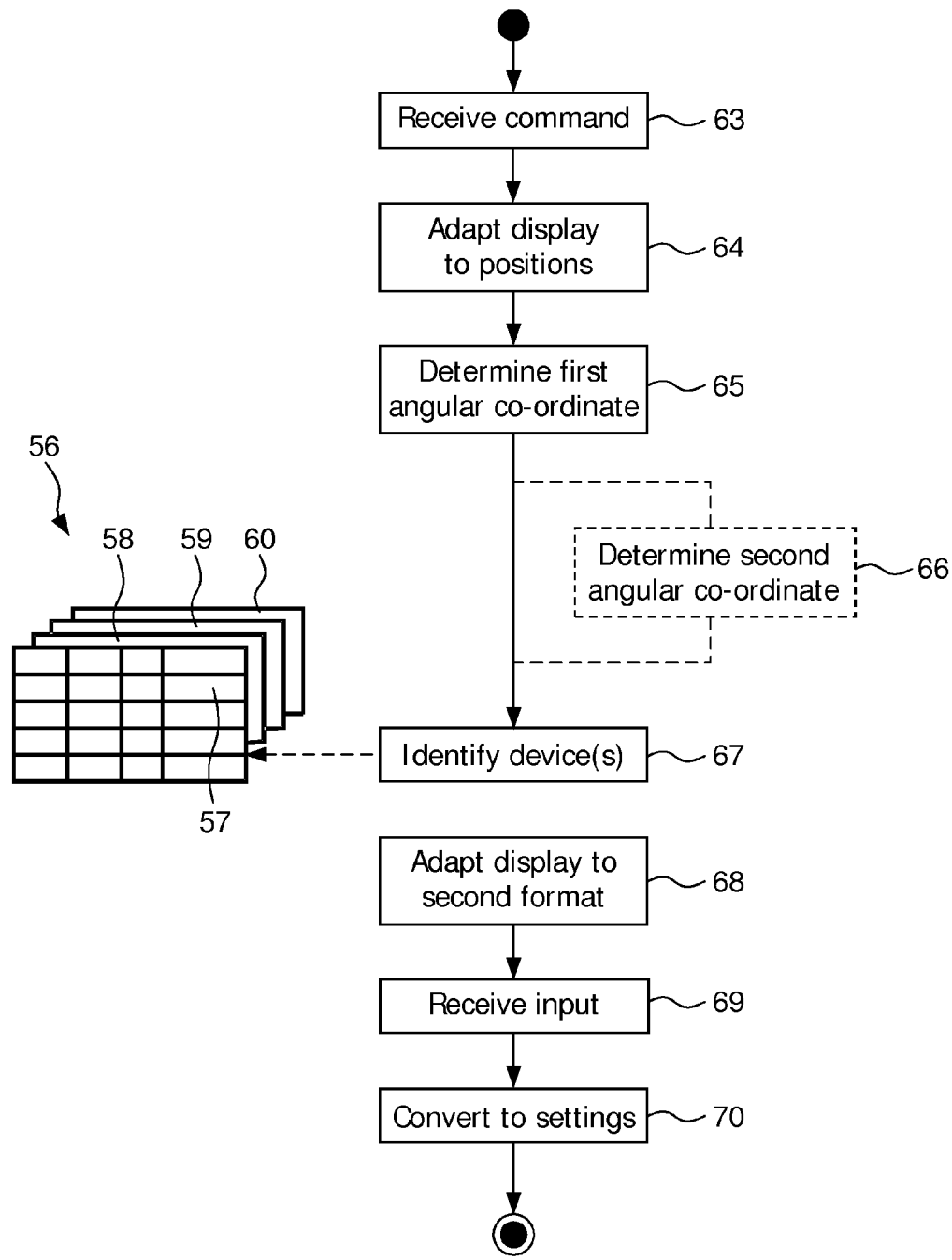
FIG. 8 is a flow chart illustrating a method of providing changed settings to a control system of the system of FIG. 2, wherein output devices are identified by means of their location.

FIG. 8 shows how the settings of one or more of the light units 6-8 can be changed, e.g. to change the color of the light output. In this method, the light units 6-8 to which the settings apply are identified by their location as maintained in the database 56.

In a first step 63 the user provides an appropriate command to change the mode to one in which the color of the light is changed, e.g. by pressing the button 44 for changing the mode.

In an optional next step (not shown), a preliminary mode allows the user to select a device type. To this end, icons can be displayed on the wheel 29, for example. This step would allow a user to select only devices of a certain type by indicating a location or range of locations, rather than all devices at that location or within that range of locations. In this way, for example, the user can indicate that the new settings that follow apply only to spotlights or only to ambient lighting devices providing background lighting, not to all light units 6-8.

Assuming the room is known, the display device 27 is caused to display the compass points as shown in FIG. 4 (step 64).

The user then indicates at least a first angular co-ordinate (step 65) by touching the wheel 29 at an appropriate point 31. Optionally, the user then moves to a second point of contact 31, of which the angular location is determined (step 66), so that a compass segment is defined.

The control device 9 then identifies (step 67) all light units 6-8 within the compass segment, or the nearest device to the first angular co-ordinate if the second input step 66 is omitted. This identification step 67 uses the settings obtained using the method of FIG. 6. If the user has made a circular gesture along the entire circumference of the wheel 29, then all light units 6-8, or at least all light units 6-8 of the type indicated previously in the optional step described above, are identified as targets for new device settings.

Then, the display device 27 is cause to display a representation of a color circle in the place of the compass points (step 68). The user can select a color through the point 31 of contact with the wheel 29. This input is received (step 69) and used to compose settings (step 70) for all devices identified in the earlier step 67.

In a further step (not shown), the display device 27 is caused to display a representation of a set of values, e.g. a scale, for setting a further aspect of the light to be emitted by the selected ones of the light units 6-8. Examples include the CCT (correlated color temperature), brightness and the saturation.

Thus, the principles behind the configuration of the remote control unit 10 can be used both to input the locations of output devices when the system for providing the ambience is set up, but also subsequently to change the settings of individual ones of the output devices.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

In the illustrated embodiments, the component for manipulation by a user defines a plane surface on which a user can indicate a point, data representative of the user input corresponding to an angular co-ordinate of the point about only one axis through a central point 30. In an alternative embodiment, data representative of user input corresponding to two angular co-ordinates of the point about respective axes are obtained. In that case, the surface can be a three-dimensional surface, e.g. a sphere or hemisphere. Instead of moving a finger 32 across the surface, the component providing the surface can be moved relative to a fixed point in a remote control unit, e.g. in the shape of a track ball, provided that a sensor arrangement is provided that is able to determine an absolute location, rather than just a displacement.

In yet another embodiment, the surface is that of a touch screen, and the user can place two fingers on the touch screen, one point of contact serving as the reference point (second point).

Alternatively, the reference point is a point in the remote control unit, and the point of which the angular co-ordinate is to be detected is another point on the remote control unit, with the housing of the remote control unit being the component for manipulation by a user. Turning the remote control unit to a certain position will provide a value of an angular co-ordinate in such a set-up. This embodiment is implemented in a first variant by means of accelerometers within the housing of the remote control unit 10 (or of a pointing device associated with the remote control unit 10 and/or control device 9). In a second variant, a digital compass in the input device is used as a sensor arrangement to provide output for determining the angle at which the input device is held.

A similar method can also be used to select an effect, by pointing at a device already providing this effect or by pointing at a representation of the effect, e.g. provided on a housing of the control device 9 or one of the output devices 6-8,45-48. Thus, the method of FIG. 8 can alternatively be implemented entirely by changing the orientation of a pointing device and confirming the input (which may simply be by holding the orientation for a pre-determined interval of time).

The invention claimed is:

1. Apparatus for providing settings of a control system, which control system is configured to control at least one output device positioned in the physical space and to maintain in memory data representative of locations of the output device in the physical space, the apparatus comprising:
   an input device for obtaining user input specifying only a relative direction, based on a reference point, of the at least one output device, and wherein the input device includes at least one component for manipulation by a user to position at least a first point on the component to specify the relative direction of the at least one output device and a sensor arrangement arranged to detect an angular co-ordinate of the first point about at least one axis through a second point of the input device, the angular co-ordinate indicating the relative direction associated with the one output device and
   a processing unit to form a spatial distribution, independent of any physical environment in an actual physical environment of the user, of perceptible output from the one output device, using the one output device's relative direction and the detected angular co-ordinate data, and configuring the at least one component for manipulation of the input device to enable control of the one output device based on the detected angular co-ordinate data.

2. Apparatus according to claim 1, wherein
   the component for manipulation by a user defines a surface,
   the component can be manipulated by a user to indicate a point on the surface as the first point, and
   the sensor arrangement is arranged to detect the location of the first point.

3. Apparatus according to claim 1, wherein
   data corresponding to an angular co-ordinate of the first point about only one axis through the second point is obtained.

4. Apparatus according to claim 1, wherein
   the second point is fixed relative to the input device.

5. Apparatus according to claim 1, wherein
   the first point on the component corresponds to a point of interaction along a trajectory laid out on the input device and surrounding the second point over at least 180°, in particular a closed trajectory.

6. Apparatus according to claim 1, further arranged to switch between a first mode, in which the user input pertaining to at least one location associated with one of the output devices is obtainable via the input device, and a second mode, in which user input pertaining to at least one controllable aspect of light emitted by output devices associated with the locations to which the user input pertains is obtainable via the input device.

7. Apparatus according to claim 6,
   wherein, in the second mode, user input pertaining to a color selection is obtainable via the input device.

8. Apparatus according to claim 1,
   wherein the input device includes at least one display device for displaying information along a path defined by the component for manipulation by the user, and wherein the apparatus is arranged to adapt the information displayed.

9. Apparatus according to claim 1, further including at least one sensor for contactless measurement of a distance to at least one of the output devices, the settings being further based on the measured distance.

10. Apparatus according to claim 1, further including an input device for obtaining user input representative of a height level of at least one of the output devices.

11. Apparatus according to claim 1, wherein
    at least the input device for obtaining user input pertaining to at least one location associated with one of the output devices is comprised in a portable housing.

12. Apparatus according to claim 1, including an input device for selecting the physical space from among a set of physical spaces.

13. Apparatus according to claim 1, wherein the reference point is the user's location.

14. Apparatus according to claim 1, wherein the control of the specified output device includes changing a light setting of the specified output device.

* * * * *